Feb. 7, 1950
H. C. WILSON
2,496,426
TOOLHOLDER
Filed Aug. 28, 1945
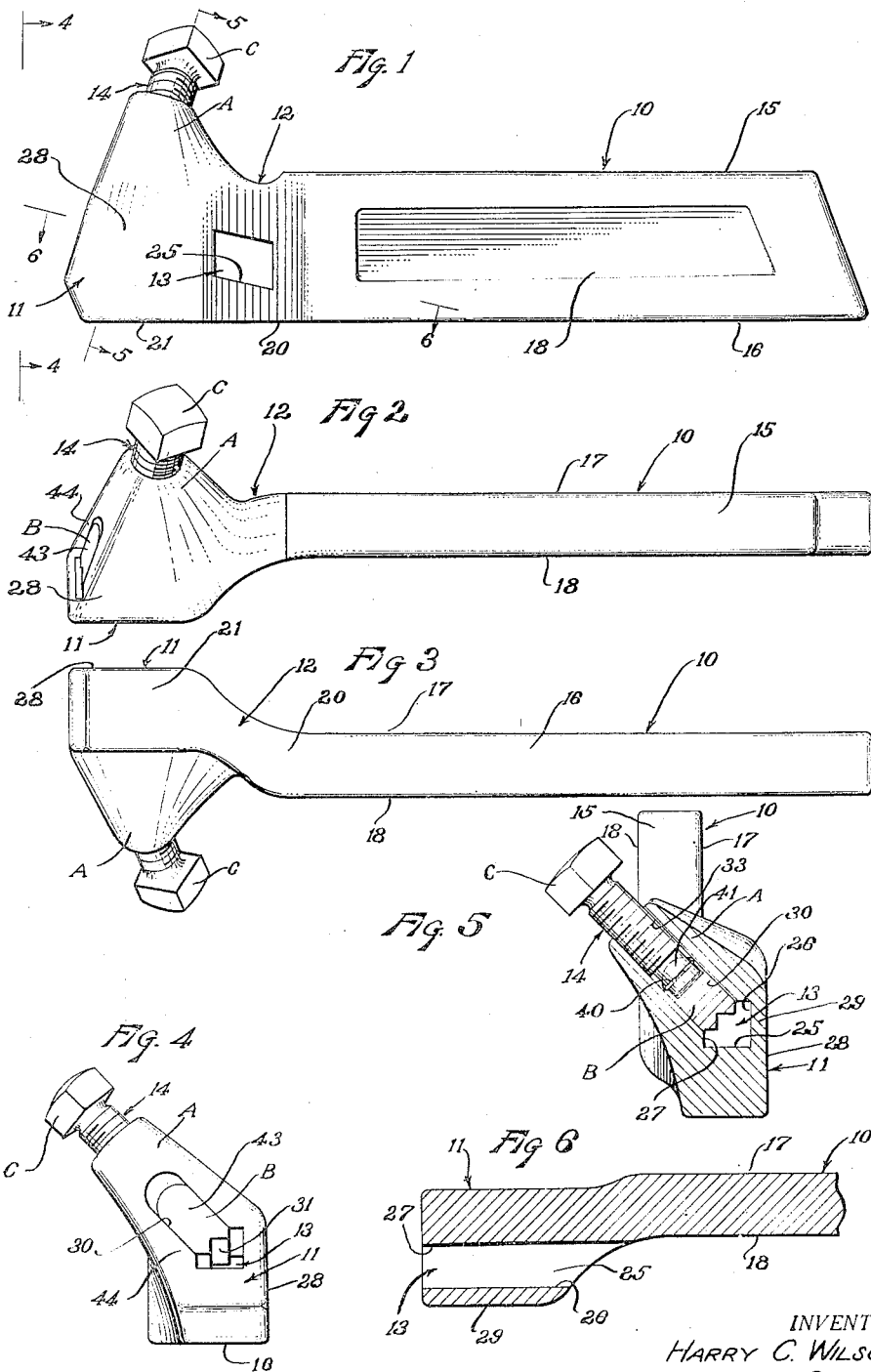
INVENTOR.
HARRY C. WILSON
BY
ATTORNEY Patented Feb. 7, 1950

2,496,426

UNITED STATES PATENT OFFICE 2,496,426

TOOLHOLDER

Harry C. Wilson, Sherman Oaks, Calif., assignor to Robert H. Clark, Los Angeles, Calif.

Application August 28, 1945, Serial No. 613,141

4 Claims. (Cl. 29—96)

This invention has to do with a tool holder and relates more particularly to a device for use in lathes or like machines for holding blades or cutting tools. It is a general object of the invention to provide a tool holder that is simple and inexpensive of construction, secure and effective in holding a cutting tool, and effective and convenient to use.

A general object of the present invention is to provide a tool holder of the straight type, that is, a holder wherein the cutting tool is carried to project substantially straight forward from the front end of the holder to be substantially parallel with the shank of the holder, and to provide various refinements and improvements in a holder of this general type.

A further object of the present invention is to provide a tool holder of the character mentioned which involves a head extending substantially parallel with the shank of the holder but offset laterally in a horizontal direction from the shank to locate the cutting end of the cutting tool in a most advantageous manner.

It is another object of the present invention to provide a tool holder of the type referred to wherein there is an upwardly projecting extension on the head of the holder, which extension is pitched or inclined to one side allowing not only full vision but also effectively avoiding interference with work. In accordance with the invention the extension of the head is pitched or inclined in a direction opposite to that in which the head is offset from the shank.

It is a further object of the present invention to provide a tool holder of the general character referred to in which the tool carrying opening or socket is located in the head to be open at both ends allowing it to be effectively and conveniently dressed by a broaching tool, or the like.

Another object of the invention is to provide a tool holder of the character referred to in which the tool carrying socket is pitched or inclined upwardly toward the front end of the head, while the head and extension have a front face lying in a plane normal to the opening or socket.

The various objects and features of my invention will be fully understood from the following detailed description of a typical preferred form and application of the invention, throughout which description reference is made to the accompanying drawings, in which:

Fig. 1 is a side elevation of the holder provided by my invention, showing it viewed from the side which is usually presented to the work;

Fig. 2 is a top plan view of the holder;

Fig. 3 is a bottom plan view of the holder;

Fig. 4 is a front elevation of the holder taken substantially as indicated by line 4—4 on Fig. 1;

Fig. 5 is a transverse sectional view taken as indicated by line 5—5 on Fig. 1; and Fig. 6 is a longitudinal sectional view taken as indicated by line 6—6 on Fig. 1.

The holder provided by this invention is intended primarily to be used in a lathe, or the like, in which case it is mounted in a suitable tool post and it is intended to carry the ordinary type of cutting tool. When I refer to the ordinary type of cutting tool I refer, generally, to a bar of hard metal or a shank of metal with a hardened tip portion and I mean to include such members of any suitable cross sectional configuration. In practice most cutting tools are square or round in cross section. However, the holder that I have provided will advantageously accommodate cutting tools of practically any cross sectional configuration proportioned so that they can be accommodated in the tool carrying socket of the holder.

The holder of the present invention involves, generally, a shank 10, a head 11 beyond the forward end of the shank and laterally offset therefrom in a horizontal direction, a neck 12 joining or coupling the shank and head, a tool carrying passage or socket 13 extending lengthwise through the head, and means 14 for securing a tool in the socket, which means includes, generally, an extension A of the head, a clamp block B to engage the cutting tool, and an actuating screw C carried by the extension A to operate the block.

The shank of the holder is preferably a straight elongate element substantially rectangular in cross sectional configuration. The shank illustrated is considerably taller than it is wide and has flat horizontal top and bottom faces 15 and 16, respectively, and flat parallel vertical sides 17 and 18.

The head 11 extends substantially parallel with the shank 10 and is located beyond the forward end of the shank and is laterally offset in a horizontal direction from the shank. In the particular case illustrated the head is offset at the side 18 of the shank and is offset a substantial distance. The head is offset a distance substantially equal to the width of the shank.

The neck 12 is a suitable curved or shaped part coupling or joining the shank and head, and the extent and configuration of the neck determines the offsetting and disposition of the head relative to the shank. In the preferred construction the shank head and neck are integrally joined or formed of one continuous body of material and the parts are related and proportioned so that the neck 12 is as short as possible, to the end that the unit formed by these parts is strong and rigid.

In practice I prefer to provide the neck and head with flat finished bottom faces 20 and 21, respectively, and these faces are preferably continuous with the bottom 16 of the shank so that these several parts can be effectively and accurately finished in one single operation. With this construction the tool may be supported entirely from the shank or, if desired for rigidity the support may be extended to engage under the neck of the holder or under the head of the holder, or both.

The tool carrying passage or socket 13 extends longitudinally through the head 11, preferably parallel with the shank, from the forward end of the head to the rear end of the head. The forward end of the socket 13 is open so that a tool carried in the socket can project forward from the head 11 while the rear end of the socket opens where the head and neck join and opens so that it clears the shank, as shown in Fig. 6. By locating and proportioning the socket 13 relative to the head and shank so that the socket is fully offset relative to the shank, the socket is in the nature of a clear unobstructed opening that can be quickly and effectively finished by a broaching tool, or the like.

The socket is preferably square in cross sectional configuration and has a flat bottom 25 and vertical side 26 and 27. The side 26 of the socket is adjacent and parallel to what I will term the outer side 28 of the head which is the side of the head which faces the work when the tool is in normal or ordinary working position in a lathe, or the like. The portion or wall 29 of the head between the wall 26 and side 28 is preferably made as thin or narrow as possible, so that a tool carried in the holder can be brought close to the work without interference by the head of the holder. In practice the tool holding socket may be arranged to extend horizontally through the head. However, I prefer to incline or pitch the socket so that it extends upward and forward to be somewhat higher at the front end of the head than at the rear end thereof. The angle or pitch thus given to the socket may be such as to give a tool the desired pitch relative to the work being cut.

The extension A of means 14 is, in effect, an extension of the head 11 projecting upwardly from the top of the head and inclined or pitched relative to the head to extend upwardly and laterally in a direction opposite to that in which the head is offset from the shank. The parts are arranged and related so the extension A extends at an angle of substantially 45° and its central axis intersects the corner formed by the bottom 25 and side 26 of the socket 13.

A guideway 30 is formed in the extension A extending in the direction of the extension or up in an inclined direction away from the corner formed by the bottom 25 and side 26 of the socket 13. The guideway 30 has flat parallel sides and the clamp block B is a flat-sided block slidably carried in the guideway.

The lower or clamping face of the block B is preferably provided with a notch or channel 31 to effectively receive or grip a tool arranged in the channel and makes the holder particularly effective for gripping polygonal tools of various sizes, as well as tools that are round in cross section.

A threaded bore 33 is provided in the upper portion of the extension A parallel and communicating with the guideway 30. The clamp screw C provided for operating the block B is threaded in the bore 33 and is releasably coupled to the block by a spring ring 40. The clamp screw has a turned end 41 which fits into a socket provided in the upper part of the block B and the end of the screw bears on the bottom of the socket so that the screw can be operated to force the block into effective clamping engagement with a tool arranged in the socket 13.

The block B extends a substantial distance lengthwise of the socket 13 to have a long bearing engagement with a tool arranged in the socket and it is preferred to proportion the parts so that the front end 43 of the block is flush with the front face 44 formed by the head 11 and extension A.

The front face 44 formed by the head 11 and extension A is preferably a flat finished face in a plane normal to the longitudinal axis of the socket 13. Where the socket is pitched to extend upward as above described, so its forward end is higher than its rear end, the face 44 will extend upwardly and somewhat rearwardly, as shown throughout the drawings.

In using the holder of the present invention it may be carried in a tool post the same as any ordinary tool holder. A cutting tool of any suitable length can be arranged in the socket 13 to project the desired distance forward of the face 44. If the tool is long it may project from the rear of the head 11 to extend along the side 18 of the shank, it being a feature of the invention that the holder will accommodate a tool of considerable length. The tool is made secure in the socket 13 by operating the screw C in the bore 33 causing the block B to be forced against the tool so that the tool is wedged or clamped in the corner formed by the bottom 25 and side 26 of the socket. Through this clamping action the tool is held not against one single flat surface but is wedged between the two surfaces or parts of the socket and is thus effectively held against movement. Through the spring ring coupling the screw and block, the block is carried with the screw so that when the screw is released or backed up the block is carried away from the tool releasing it so that it can be readily withdrawn from the socket 13.

Having described only a typical preferred form and application of my invention, I do not wish to be limited or restricted to the specific details herein set forth, but wish to reserve to myself any variations or modifications that may appear to those skilled in the art, or fall within the scope of the following claims.

Having described my invention, I claim:

1. A tool holder of the character described including, an elongate shank adapted to be held in a horizontal position, a head beyond the forward end of the shank, a neck joining the shank and head so the head is substantially parallel with and horizontally offset from the shank, there being a tool carrying opening extending through the head substantially parallel with the shank and open at the forward end face of the head and also at the rear end face of the head where it is clear of the shank, an extension on the top of the head extending upwardly from the head and laterally of the head in a direction opposite to that in which the head is offset from the shank, a clamp block carried by the extension, and an operating screw carried by the extension and engaging the block.

2. A tool holder of the character described including, an elongate shank adapted to be held in a horizontal, position, a head beyond the forward end of the shank, a neck joining the shank and head so the head is substantially parallel with and horizontally offset from the shank, there being an opening extending through the head open at the forward end of the head and at the rear of the head clear of the shank, an extension on the top of the head extending upwardly from the head and laterally of the head in a direction opposite to that in which the head is offset from the shank, a clamp block carried by the extension, and an operating screw carried by the extension and engaging the block, the opening having a horizontal bottom and a vertical side forming a tool receiving corner, and the block being arranged to clamp a tool into said corner.

3. A tool holder of the character described including, an elongate shank adapted to be held in a horizontal position, a head beyond the forward end of the shank, a neck joining the shank and head so the head is substantially parallel with and horizontally offset from the shank, there being an opening extending through the head open at the forward end of the head and at the rear of the head clear of the shank, an extension on the top of the head extending upwardly from the head and laterally of the head in a direction opposite to that in which the head is offset from the shank, a clamp block carried by the extension, and an operating screw carried by the extension and engaging the block, the opening being pitched so it is higher at the forward end of the head than at the rear end of the head, the forward end of the holder being in a plane normal to the longitudinal axis of the opening.

4. A tool holder of the character described including, an elongate shank adapted to be held in a horizontal position, a head beyond the forward end of the shank, a neck joining the shank and head so the head is substantially parallel with and horizontally offset from the shank, there being an opening extending through the head open at the forward end of the head and at the rear of the head clear of the shank, an extension on the top of the head extending upwardly from the head and laterally of the head in a direction opposite to that in which the head is offset from the shank, a clamp block carried by the extension, and an operating screw carried by the extension and engaging the block, the shank, neck and head being formed of a single continuous body of material and having flat finished bottom faces in a common plane, the opening being pitched so it is higher at the forward end of the head than at the rear end of the head, the forward end of the holder being in a plane normal to the longitudinal axis of the opening, the opening having a horizontal bottom and a vertical side forming a tool receiving corner, and the block being arranged to clamp a tool into said corner.

HARRY C. WILSON.

REFERENCES CITED

The following references are of record in the file of this patent:

UNITED STATES PATENTS

| Number | Name | Date |
|---|---|---|
| 1,387,417 | Lennon | Aug. 9, 1921 |
| 1,648,380 | Dover | Nov. 8, 1927 |
| 2,357,918 | Trippler | Sept. 12, 1944 |